C. W. SPICER.
INCASED UNIVERSAL JOINT.
APPLICATION FILED JAN. 17, 1907.
958,023.
Patented May 17, 1910.
2 SHEETS—SHEET 1.
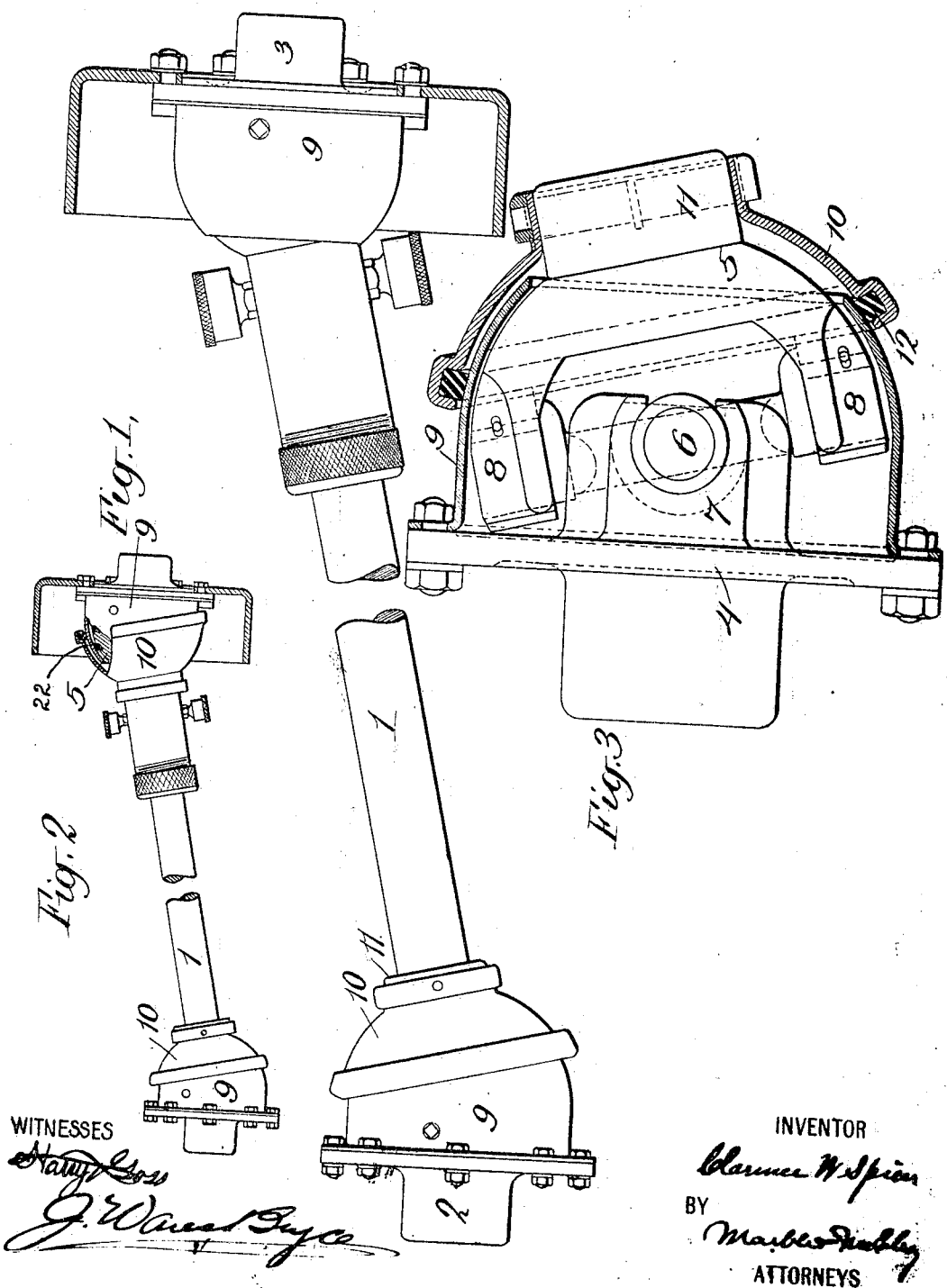
WITNESSES
INVENTOR
BY
ATTORNEYS C. W. SPICER.
INCASED UNIVERSAL JOINT.
APPLICATION FILED JAN. 17, 1907.
958,023.
Patented May 17, 1910.
2 SHEETS—SHEET 2.
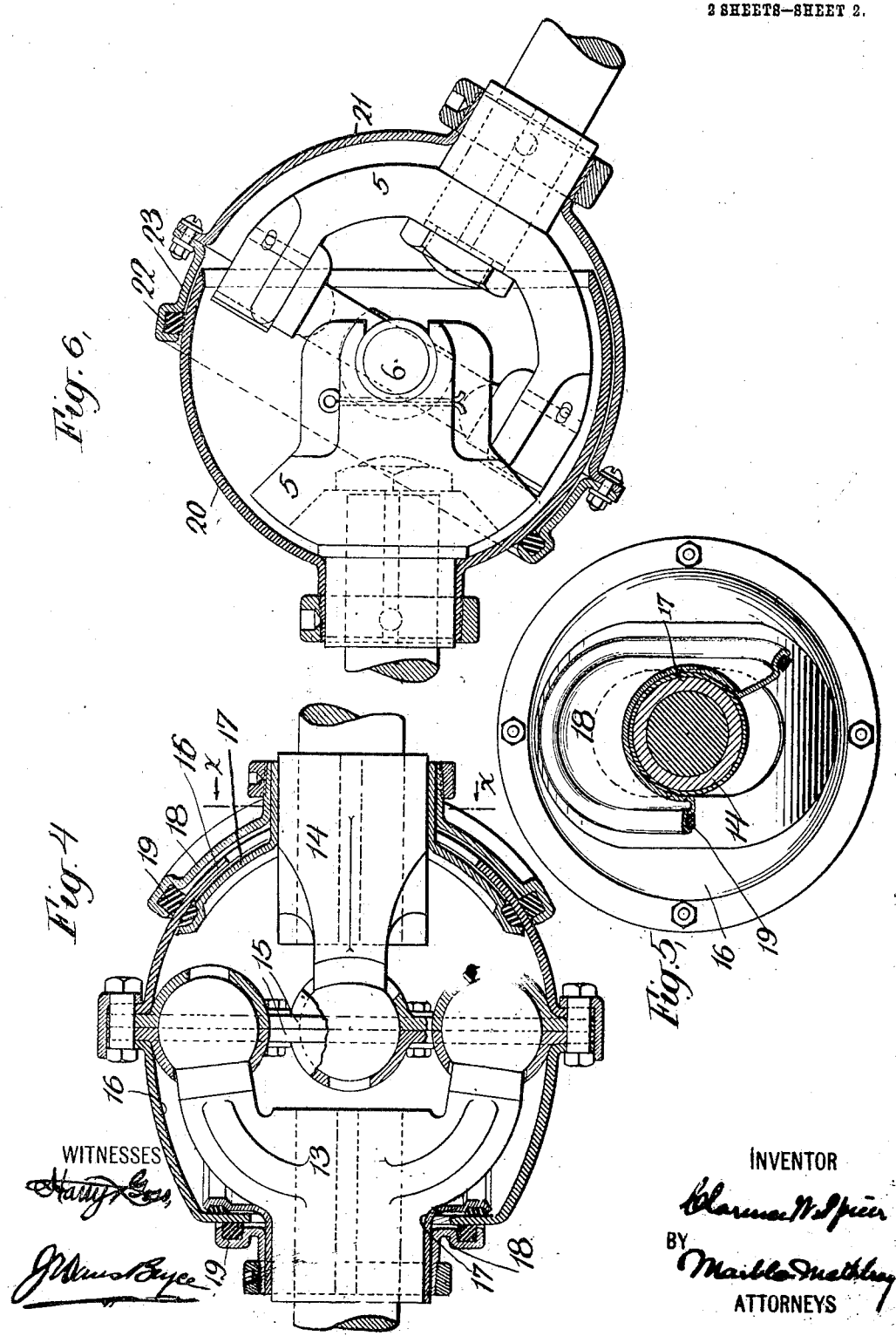
WITNESSES
INVENTOR
BY
ATTORNEYS

UNITED STATES PATENT OFFICE.

CLARENCE W. SPICER, OF PLAINFIELD, NEW JERSEY.

INCASED UNIVERSAL JOINT.

958,023.  Specification of Letters Patent.  Patented May 17, 1910.

Application filed January 17, 1907. Serial No. 352,785.

*To all whom it may concern:*

Be it known that I, CLARENCE W. SPICER, a citizen of the United States, residing at Plainfield, in the county of Union and State of New Jersey, have invented certain new and useful Improvements in Incased Universal Joints, of which the following is a specification.

My invention relates to incased universal joints, such for example as that covered by my Patent No. 768,407, dated Aug. 23, 1904, and comprises novel and improved inclosing means for universal joints.

My invention consists in a cap adapted to fit over and close, in all positions, the open end of a suitable casing member; all as more fully described hereinafter and particularly pointed out in the claims.

The objects of my invention are, to improve the construction of casings for universal joints; to prevent the entrance of dirt, dust, slush, mud, water, etc. to the working parts of such joints; to retain lubricant; to permit the joint to work through a wide angle; and generally to make the device simple, reliable, and easy to manufacture.

Incased universal joints of the type referred to are extensively used in the driving mechanism of motor vehicles, and launches, and in various other places where it is necessary to permit relative motion of driving and driven members. They usually comprise a casing member, secured to one member of the universal joint proper, and fitting closely the other member of the joint in such manner as to permit free movement of the latter through a considerable range while preventing the entrance of dirt and dust and the like; and frequently suitable packing is provided, the structure being made fluid tight, so that lubricant may be retained within it. In automobile driving mechanism, it is common to employ a longitudinal "propeller" shaft, usually arranged intermediate the engine or speed-changing gearing and the compensating gear or sprocket shaft; and this "propeller" shaft, besides being exposed to the flying dust, mud, slush, etc. owing to its exposed position beneath the car, is usually or frequently inclined downward at quite a considerable angle; from which results a tendency for all the mud, slush or water which collects on the inclined shaft to run down therealong upon the universal joint at the lower end of the shaft, the inclosing members of which are therefore much more likely to wear than are the corresponding parts of the joint at the opposite end of the shaft.

With a view to shedding more effectually mud, slush, water and the like, I provide a cap, which may be termed a "weather cap", external of the main casing member, but fitting closely thereto, preferably with packing therebetween, and constructed to permit free relative universal movement of such casing member and cap. This cap and the casing member may be so constructed that they together constitute the real inclosing casing of the joint; or the cap may be purely a weather cap, the real inclosing of the joint being produced by a casing member coacting with an end closure or the like formed on or carried by one member of the universal joint.

The accompanying drawings illustrate certain embodiments of my invention.

In said drawings, Figure 1 shows a side elevation of a "propeller" shaft such as commonly employed on automobiles, provided at both ends with incased universal joints of the type covered by my said Patent No. 768,407, the joint at the lower end of the shaft having also a "weather cap." Fig. 2 is a similar view on a smaller scale, showing "weather caps" for both joints and showing a portion of one weather cap and casing broken away. Fig. 3 shows an elevation of one of the joints, with the casing member and weather cap sectioned. Fig. 4 is a view similar to Fig. 3 of an alternative form of incased universal joint provided with weather cap. Fig. 5 shows an end view of a joint such as shown in Fig. 4, the view being a section taken on the line x—x of Fig. 4, a portion of one weather cap being broken away; and Fig. 6 shows an elevation of a universal joint, with the casing sectioned, wherein what is shown in the other views as a weather cap becomes one of two over-lapping casing members, together completely inclosing the working parts of the universal joint; the construction shown in this figure being especially suitable for joints required to work through wide angles.

Referring first to Figs. 1, 2 and 3, 1 designates the propeller shaft, and 2 and 3 incased universal joints at the ends thereof. Each joint is of the general type shown in my said patent, comprising end members 4 and 5, of which either may be a driving member and the other the driven member, and an intermediate member or trunnion block 6, to which both members 4 and 5 are pivotally connected, the pivotal axes of the two members being at right angles. The member 4 is a disk having horns 7 containing the bearings for the trunnion block 6, and the member 5 has similar horns 8, the rear face of this member 5 being of substantially spherical curvature, however, so as to form a closure for the opening in a spherically-curved casing member 9 secured to joint member 4. So far as described the construction is substantially that of my said prior patent. 10 is the afore-mentioned weather cap. It is a light shell, or cap, preferably formed of sheet or pressed metal and of approximately spherical curvature, and is mounted upon the hub-boss 11 of joint member 5 and closes the opening in casing member 9 through which said hub-boss projects; in so doing supplementing the closing of said opening by the spherically-curved rear face of member 5. I commonly provide this cap 10 with a groove containing suitable packing material 12 forming a tight joint with the casing member 9.

As the joints constructed according to my said Patent No. 768,407 are commonly made, packing is provided between the rear spherically-curved surface of member 5 and the casing member 9, and in said patent such packing material is shown; and in Fig. 2 I have also shown such packing at 22. Placing packing material between the casing member 9 and cap 10 is not inconsistent with the use of packing material between said member and joint-member 5, but to the contrary is highly advantageous; the packing material of the cap 10 then serving in the main to keep out mud and slush and thus greatly reducing the wear on the inner packing material, which therefore is the better able to perform its function of keeping out fine dust and of retaining lubricant within the casing, besides keeping out any liquid which may leak past the packing material of the cap. But with packing material between the cap and casing-member, there is not the same occasion as before for packing between the casing-member and joint member 5, and therefore in Fig. 3 I have shown the joint without such inner packing material. I may also provide the upper universal joint, 3, with a similar weather cap 10, as shown in Fig. 2. A weather-cap is also applicable to incased universal joints the casings of which have curvatures other than spherical. Such a joint is shown in Figs. 4 and 5, in which 13 and 14 are driving and driven members having spherical bearing-journals fitting within corresponding bearing-sockets in intermediate disks 15; and 16, 16 are casing members secured to said disks and extending in opposite directions therefrom, the outer ends of said casing members being cylindrical in curvature, the axes of such cylindrically curved surfaces being at right angles and intersecting at the center of the joint. The joint members 13 and 14 carry correspondingly-curved caps 17, within but adjacent to the ends of said casing members 16 and closing the apertures in said ends through which said members 13 and 14 pass; and said members 13 and 14 also carry other cylindrically-curved weather caps 18, outside the casing members but adjacent to the ends thereof and provided with grooves 19 containing packing material. It is obvious that the casing so constructed, and the weather caps therefor, are the mechanical equivalents of the form of casing shown in Fig. 3 and the weather cap therefor, respectively.

It is sometimes desirable to be able to incase universal joints intended to work through relatively wide angles. Joints such as shown in Fig. 3 and in Figs. 4 and 5 are in practice limited to a comparatively small range of angular movement of their driving and driven members. To provide a casing which will permit a wider range of movement I may proceed as shown in Fig. 6, the joint-members, 5, 5 and 6 of which are in general construction the same as the corresponding members of the joint shown in Fig. 3, except that neither end member is a disk, but both are constructed the same as member 5 of Fig. 3. The casing for this joint comprises two spherically-curved members, 20 and 21, each somewhat more than a hemi-sphere, member 21 embracing member 20 and provided with a groove 22 for packing material. To permit assembling of this casing, the outer member 21 is formed in two parts, comprising, besides its main part, which is a little less than a hemisphere, a ring 23 extending beyond the equator of said member 21 and so having at its outer end an orifice too small to permit the casing member 20 to be pulled out. This ring 23 therefore holds the members 20 and 21 together in all possible angular positions of said casing members.

What I claim is:—

1. The combination with an incased universal joint structure, comprising driving and driven members, means connecting said members for the transmission of the motion from one to another, and a casing inclosing said driving and driven members, having an opening through which one of said members projects, such opening substantially closed by the member so projecting therethrough, of a cover for said opening outside of said casing but coacting therewith, and mounted upon the member so projecting through said opening.

2. A power transmitting device comprising two universal joints and a shaft connecting said joints, each such joint comprising driving and driven members and means connecting said members for the transmission of motion from one to another, that one of said members, of one such joint, which is not connected to the shaft, having a casing provided with an opening through which the other said member of that joint projects, such opening substantially closed by said member so projecting therethrough, said casing thereby substantially inclosing the joint, in combination with a protecting cap for said incased joint, mounted on that member of said joint which is connected to said shaft and fitting over, coacting with, and partly inclosing the casing of that joint.

3. A power transmitting device comprising two universal joints and a shaft connecting said joints, each such joint comprising driving and driven members and means connecting said members for the transmission of motion from one to another, that one of said members, of one such joint, which is not connected to the shaft, having a casing provided with an opening through which the other said member of that joint projects, such opening substantially closed by said member so projecting therethrough, the said casing having a curved surface substantially concentric with its respective joint, in combination with a protecting cap for such incased joint mounted on that member of said joint which is connected to said shaft and fitting over and coacting with the curved surface of said casing.

4. The combination with an incased universal joint structure, comprising driving and driven members, means connecting said members for the transmission of motion from one to another, one of said members being provided with a curved surface substantially concentric with the axis of oscillation of that member, and a correspondingly-curved casing member inclosing said curved surface and having an orifice substantially closed thereby, said casing member mounted upon another member of the joint, of a cover for said orifice outside of said orificed member but coacting therewith, and mounted upon the member provided with such curved surface.

5. The combination with an incased universal joint structure, comprising driving and driven members, means connecting said members for the transmission of motion from one to another, one of said members being provided with a curved surface substantially concentric with the axis of oscillation of that member, and a correspondingly-curved casing member inclosing said curved surface and having an orifice substantially closed thereby, said casing member mounted upon another member of the joint, of a cover for said orifice outside of said orificed member but coacting therewith, and mounted upon the member provided with such curved surface, and packing rings between said cover and the casing.

6. The combination with an incased universal joint structure, comprising driving and driven members, means connecting said members for the transmission of motion from one to another, one of said members being provided with a spherically curved surface substantially concentric with the axis of oscillation of that member, and a correspondingly-curved casing member inclosing said curved surface and having an orifice substantially closed thereby, said casing member mounted upon another member of the joint, of a cover for said orifice outside of said orificed member but coacting therewith, and mounted upon the member provided with such curved surface.

In testimony whereof I affix my signature in the presence of two witnesses.

CLARENCE W. SPICER.

Witnesses:
 STANG. BURDICK,
 ASA F. RANDOLPH.